W. D. OHAVER.
DASHBOARD GAGE FOR GASOLENE TANKS.
APPLICATION FILED JAN. 24, 1920.
1,388,151. Patented Aug. 16, 1921.
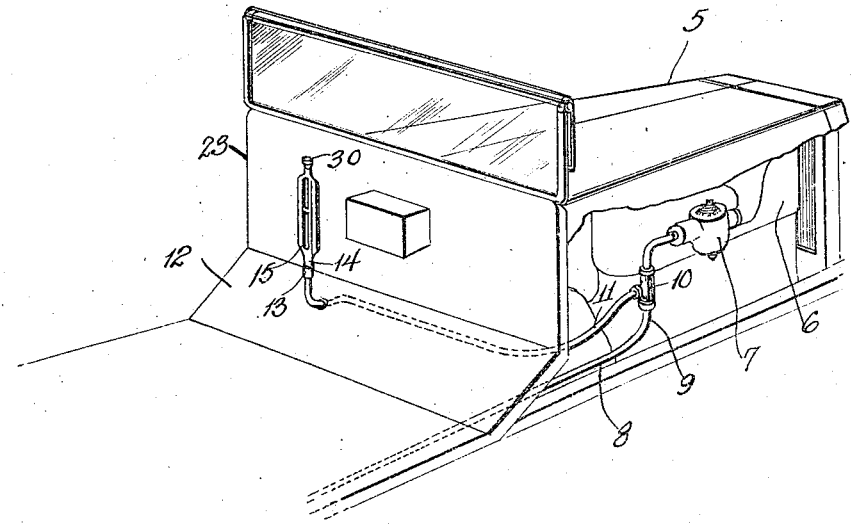
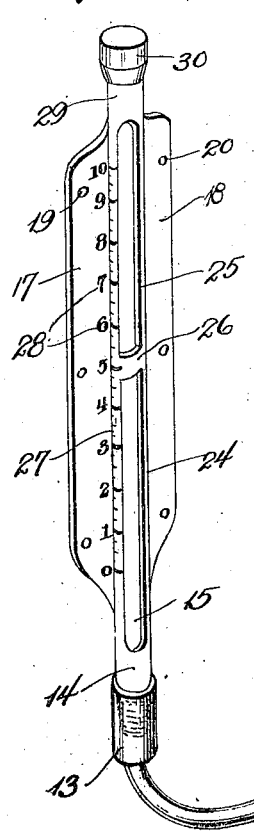
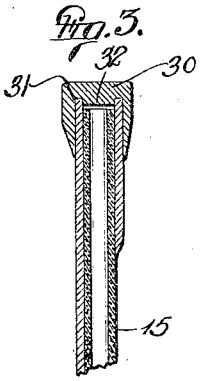
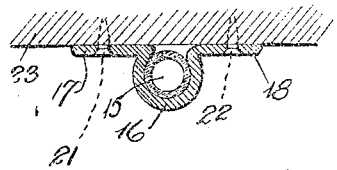
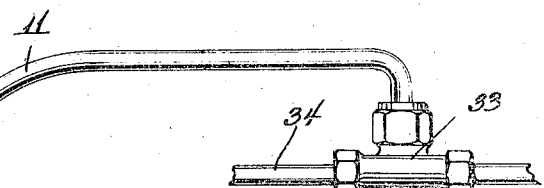
Inventor
William D. Ohaver
By Edgar M. Kitchin
His Attorney

UNITED STATES PATENT OFFICE.

WILLIAM D. OHAVER, OF JUDSON, INDIANA, ASSIGNOR TO MONTGOMERY MFG. COMPANY, OF WAVELAND, INDIANA, A CORPORATION OF INDIANA.

DASHBOARD-GAGE FOR GASOLENE-TANKS.

1,388,151.  Specification of Letters Patent.  Patented Aug. 16, 1921.

Application filed January 24, 1920. Serial No. 353,766.

*To all whom it may concern:*

Be it known that I, WILLIAM D. OHAVER, a citizen of the United States, residing at Judson, in the county of Parke and State of Indiana, have invented certain new and useful Improvements in Dashboard-Gages for Gasolene-Tanks; and I do hereby declare the following to be a full, clear, and exact description of the invention, such as will enable others skilled in the art to which it appertains to make and use the same.

The present invention relates to improvements in automobile attachments, and more specifically relates to a dash-board gage for gasolene tanks.

The object of the present invention is to provide a gage on the dash or instrument board of automobiles or other vehicles carrying gasolene or other similar fuel tanks, whereby the driver of the machine may be at all times informed of the condition of the fuel in the fuel tank.

Oftentimes motorists find that they have allowed the gasolene in the tank, which is generally kept at the rear of the vehicle, where it is seldom examined to ascertain the quantity of fuel therein, to exhaust itself, and they thus find themselves out of gasolene at points remote from garages or filling stations. This is costly as it requires towing of the machine to a garage or station, or it requires, at great inconvenience, a service car to bring gasolene to the stranded machine.

It is an object of the present invention, therefore, to avoid predicaments of this kind, and the invention contemplates carrying this into effect by placing in full view of the driver a gage which is in connection with the fuel tank and which at all times accurately shows the height of the fuel level therein.

A further object of the present invention resides in providing a gage of simple construction, adapted for manufacture and sale at low cost, whereby the same may be generally brought into wide use.

With these and further objects in view as will in part hereinafter become apparent and in part be stated, the invention comprises certain novel constructions, combinations and arrangements of parts as subsequently specified and claimed.

In the accompanying drawing,—

Figure 1 is a fragmentary, perspective view, with parts broken away, of a Ford automobile with an improved gage constructed according to the present invention applied thereto.

Fig. 2 is a perspective view of the gage shown in combination with its connections, which are partially broken away.

Fig. 3 is an enlarged, fragmentary, vertical sectional view through the gage, and Fig. 4 is a horizontal sectional view through the same.

Referring more particularly to the drawing, wherein only a single embodiment of the invention is illustrated, 5 designates generally an automobile, such, for example, as a Ford motor car, having the engine 6 and the usual carbureter 7 for preparing the explosive mixture therefor. A pipe line 8 is shown as connecting with the carbureter 7 and as running rearwardly beneath the body of the vehicle, this being the usual connection to the carbureter 7 from the gasolene tank carried either beneath the forward or rear seats. The pipe line 8 includes a vertically extending portion 9 which rises up to the level of the carbureter 7.

According to the invention, the vertical portion 9 of the pipe line 8 is tapped and the liquid gasolene is allowed to flow from this point to the improved gage which is held on the dash or instrument board of the vehicle. The pipe is tapped preferably by including therein a T-coupling 10 forming a continuation of the pipe line, and also connected to a tube or conduit 11, which passes around to the rear of the engine 6 and goes through the foot-board 12 or other portion of the vehicle. The tube 11 is provided with a rubber nipple 13, as best shown in Fig. 2, which tightly embraces the lower tubular end of a sheet metal gage frame 14 which contains the glass tube 15. This glass tube 15 is also open at its lower end in order to receive the liquid gasolene through the tube 11. The nipple 13 is made of such dimensions that it must be expanded in order to slide over the tubular end 14 of the gage frame, after which it will tightly grip the same and exclude air while also preventing the escape of any of the liquid gasolene. The tube 15 is of glass, or other transparent material, through which the height of the gasolene column therein may be quickly read. Such tube 15 is carried within the sheet metal frame, which is preferably formed in the manner most clearly illustrated in Fig. 4, wherein such frame is shown to be crimped centrally or displaced to form a substantially cylindrical housing 16 of the same general cross sectional curvature as the glass tube 15, whereby to tightly embrace the same and protect the glass tube from shocks and blows that might otherwise break the same. The free ends of the sheet metal frame are extended in the same plane at substantially tangents to the cylindrical housing 16, and provide a pair of plates 17 and 18 at opposite sides of the housing. The plates are perforated as indicated at 19 and 20 to receive screws or other fastening devices 21 and 22, which enter the dash-board 23 and secure the gage thereto, substantially in the position shown in Fig. 1.

As shown to advantage in Fig. 2, the front wall of the housing 16 is provided with vertically elongated slots or cut-away portions 24 and 25 for the purpose of exposing the glass tube 15 to view and allowing the driver of the vehicle to observe therethrough the condition of the liquid column. A strip 26 is left between the slots 24 and 25 to strengthen the sheet metal frame and to better confine the glass tube 15 in place.

At one side of the slots 24 and 25 the housing 16 is provided with graduations 27, while adjacent such graduations are numerals of reference 28, borne by the plate 17. These numerals 28 appear on the plate 17 and are, consequently, susceptible of being displayed in larger size than if borne by the housing 16, and they are also more easily viewed as they are carried by a part extending at right angles to the line of vision. The numerals are, therefore, more easily read than if provided directly on the curved outer wall of the housing 16.

The upper end 29 of the metal frame is also formed tubular, being an extension of the housing 16. A rubber cap 30 fits snugly over the open upper end 29 of said housing extension and is provided with a recess 31 annular in form for fitting tightly over the upper edge of said end 29, leaving a depending central portion 32 which enters the end 29 for a short distance and lies in close proximity to the upper end of the glass tube 15. The rubber cap 30 effectually excludes the escape of air which is necessary in the upper portion of the tube 15 to properly cushion the liquid column and prevent its rapid rise when the vehicle is descending hills, or due to the effect of shocks and jars.

In Fig. 2, the tube 11 is shown as connecting with a T-coupling 33 included in a horizontal pipe line 34 passing between the carbureter and the gasolene tank. It will be obvious that a great variety of different mechanical means may be resorted to for connecting the improved gage in a gasolene tank. The improved device is more especially adapted for use in connection with Ford automobiles where no vacuum tanks are employed and where gravity is depended on to feed the fuel from the tank to the carbureter. Fuel thus flowing from the tank through the pipe 8 to the carbureter 7 will also fill the conduit 11 and rise in the glass tube 15, which is placed on the vehicle at the same elevation as the fuel tank. The numerals 28 on the scale of the gage are also arranged at heights that correspond with similar heights in the gasolene tank, so that the upper level of the fluid column in the glass tube 15 will show accurately the height of fuel in the tank. The driver is, therefore, apprised at all times of the precise level of the fuel in the gasolene tank, and he may make provision for the replenishment of such tank before the same recedes to too low a level.

What is claimed is:—

1. An improved gage of the character described adapted to show the level of fuel in a fuel tank comprising a sheet metal shell or frame crimped centrally to provide a substantially cylindrical housing having slots therein, a transparent tube in said housing adapted to receive the liquid fuel and show the height thereof through said slots, and side plates formed by the ends of said sheet metal shell and adapted to be attached to a vehicle.

2. An improved gage of the character described including a sheet metal shell or frame offset or crimped centrally to provide a substantially cylindrical housing open at its rear end and having the sides of the shell or casing arranged substantially tangential to said housing and extending in alinement, fastening means adapted to pass through said plates to hold the gage on the dash of a motor vehicle, and means for placing said gage in connection with the gasolene pipe line to receive the liquid fuel therein, whereby the gage may show the level in the fuel tank at all times.

3. An improved gage of the character described including a sheet metal shell or frame offset or crimped centrally to provide a substantially cylindrical housing having elongated vertical slots therein with a cross piece extending between the slots, side plates formed in one piece with the housing and extending substantially tangential thereto at the rear side thereof, said plates being in alinement and formed to receive fastenings whereby the gage may be connected to the dash of a vehicle, said housing having at one side a scale, and one of the side plates having numbers referring to the graduations on said scale, a transparent tube fitted in said housing and showing through the slots therein, and a conduit placing said transparent tube in connection with the gasolene line on the vehicle.

4. An improved gage of the character described including a sheet metal shell or casing offset or crimped centrally to provide a substantially cylindrical housing having vertically elongated slots, side plates extending in alinement and substantially tangential to the cylindrical housing at the rear thereof, said plates formed to receive fastening means for holding the gage on the dash or other board of a vehicle, said cylindrical housing being extended below the lower edges of the plates, a glass tube fitted in said housing and extending into the lower projecting end thereof, a rubber nipple secured over the lower end of the housing and tube, a conduit connected to said nipple and to the gasolene line, the upper end of said housing extending above the upper ends of the flanges, and a rubber cap having a centrally depressed portion fitted over the upper open end of the housing.

In testimony whereof I affix my signature in presence of two witnesses.

WILLIAM D. OHAVER.

Witnesses:
QUINCY A. MYERS,
HARELY W. ROBBINS.